United States Patent
Hursey et al.

(10) Patent No.: US 7,234,165 B1
(45) Date of Patent: *Jun. 19, 2007

(54) MALWARE SCANNING OF COMPRESSED COMPUTER FILES

(75) Inventors: Neil John Hursey, Hertfordshire (GB); William Alexander McEwan, Bedfordshire (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/287,129

(22) Filed: Nov. 23, 2005

Related U.S. Application Data

(63) Continuation of application No. 09/975,986, filed on Oct. 15, 2001, now Pat. No. 7,107,617.

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .................. 726/22; 726/24; 713/187; 713/188

(58) Field of Classification Search ............ 713/177, 713/181, 187–188; 726/22–26; 709/223–225, 709/229
See application file for complete search history.

(56) References Cited

U.S. PATENT DOCUMENTS

| 6,892,303 | B2 * | 5/2005 | Le Pennec et al. ......... 713/188 |
| 7,107,617 | B2 * | 9/2006 | Hursey et al. ............... 726/22 |

* cited by examiner

*Primary Examiner*—Hosuk Song
(74) *Attorney, Agent, or Firm*—Zilka-Kotab, PC; Christopher J. Hamaty

(57) ABSTRACT

A malware scanner (8) operates to scan compressed computer files (16) by compressing the malware signatures (17) using the same compression algorithm as used for the compressed computer file and then comparing the compressed malware signatures (18) with the compressed computer file directly.

18 Claims, 4 Drawing Sheets

MALWARE SCANNING OF COMPRESSED COMPUTER FILES

This application is a Continuation of prior application Ser. No.: 09/975,986, filed on Oct. 15, 2001 now U.S. Pat. No. 7,107,617, from which priority under 35 U.S.C. §120 is claimed.

BACKGROUND OF THE INVENTION

1. Field of the Invention

This invention relates to the field of data processing systems. More particularly, this invention relates to scanning for malware, such as, for example, computer viruses, Trojans, worms, banned files and banned words within e-mail messages.

2. Description of the Prior Art

It is known to provide malware scanners that operate using a library of malware signatures each comprising a plurality of characteristics identifying a particular piece of malware. The scanner searches within a computer file to be scanned to see if it contains data matching the signatures. This is a relatively efficient and effective methodology.

A problem arises when scanning compressed computer files. The compression performed upon such computer files alters the data values making up the computer file such that characteristics indicative of a computer virus will be altered by the compression process into a form in which they will not match the virus signatures within the library. In order to deal with this, the known approach is to decompress the computer file to be scanned into an uncompressed form before searching that uncompressed form of the computer file for the presence of computer viruses using the virus signatures. Whilst this avoids the disguising of computer viruses by the compression applied, it has the disadvantage of consuming a significant amount of processing resources, in terms of both processing cycles and memory, in decompressing the computer file to be scanned. By their very nature, computer files that have been compressed tend to be disadvantageously large when decompressed.

SUMMARY OF THE INVENTION

Viewed from one aspect the present invention provides a computer program product for controlling a computer to scan a compressed computer file for malware, said compressed computer file being compressed using a compression algorithm, said computer program product comprising:
   comparison code operable to compare a plurality of compressed malware signatures compressed using said compression algorithm with said compressed computer file to identify malware within said compressed computer file.

The invention recognises that it is sometimes possible to detect malware within a compressed computer file by comparing that compressed computer file with compressed versions of the malware signatures. Whilst many malware signatures require compressing, this surprisingly turns out to be more efficient than having to decompress the full compressed computer file since the malware signatures tend to be relatively short in length and will be even shorter when compressed.

It will be appreciated that depending upon the compression algorithm used, the particular way in which the malware signatures need to be compressed may vary from computer file to computer file. Accordingly, in preferred embodiments of the invention the system operates to detect from the compressed computer file to be scanned what compression algorithm has been used and then applies this detected compression algorithm to the uncompressed malware signatures to generate the compressed malware signatures.

In many preferred embodiments of the invention the compression algorithm specifying data may form part of the compressed computer file itself, such as part of a header file. This data is conventionally provided such that the decompression tools can appropriately decompress the file for its normal use.

The invention is particularly well suited to embodiments in which the computer file is compressed using Huffman coding, but it will be appreciated that other suitable compression algorithms may also be used and such alternative algorithms are intended to be encompassed by the present invention.

The efficiency with which the compressed computer file may be searched for the compressed malware signatures may be increased by using a Boyer Moore search algorithm, an algorithm based thereupon or an algorithm based upon structuring the signatures in a tree. As the compression of the computer file tends to obscure the code entry points and processing flow, a more methodical search through the file for the compressed malware signatures is required and in this context the efficiencies gained by a Boyer Moore algorithm, or one which can search in a similar way for multiple signatures in parallel, are strongly desirable.

As previously mentioned, the present invention is applicable to the scanning for malware that can take a variety of forms. The invention is particularly well suited to searching for computer viruses, Trojans, worms, banned files and e-mails containing banned content.

Viewed from further aspects the invention also provides a method of scanning a compressed computer file for malware and an apparatus for scanning a compressed computer file for malware in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
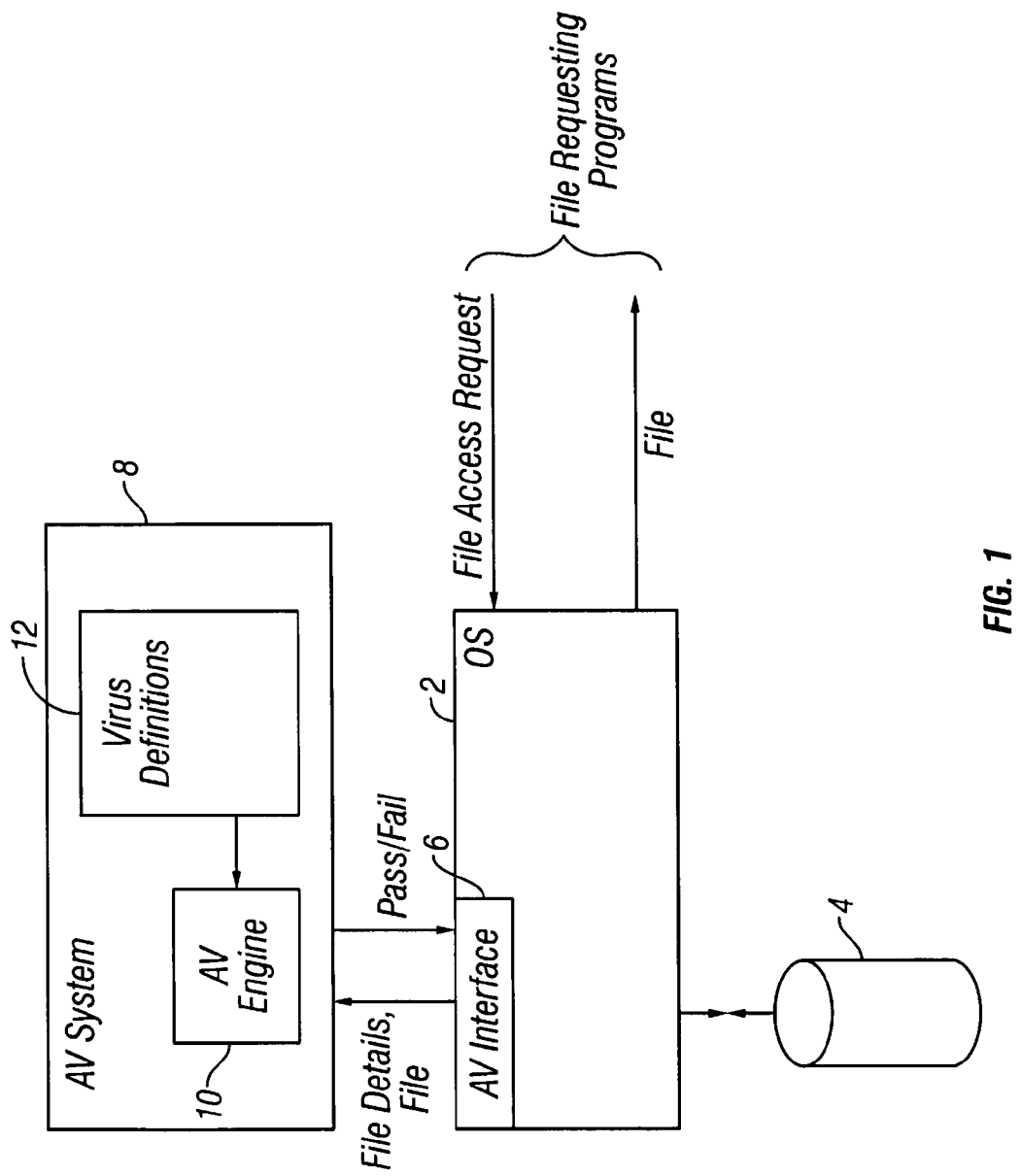
FIG. 1 schematically illustrates a malware scanning system for a computer.

FIG. 1 illustrates an operating system 2 within a computer. The operating system 2 serves to receive file access requests from file requesting programs, such as application programs, and service these requests by reading or writing to a physical device 4, such as a disk drive. The operating system 2 includes an anti-virus (malware) interface 6 which serves to intercept file access requests and have these checked by the anti-virus scanning system 8 before they are serviced. The anti-virus interface 6 passes the file details concerning the file access request together with the file itself to the anti-virus scanning system 8. A scanning engine 10 then serves to search through the file for bytes matching the virus definitions (signatures) 12 held within the anti-virus system 8. If an item of malware is detected, then the anti-virus system 8 triggers appropriate countermeasures, such as deletion, quarantining, repair, alert message generation etc. A pass/fail signal is passed back to the operating system 2 after the malware scanning has been performed and then the operating system 2 may then continue to service the file access request as appropriate.

Figure 2:
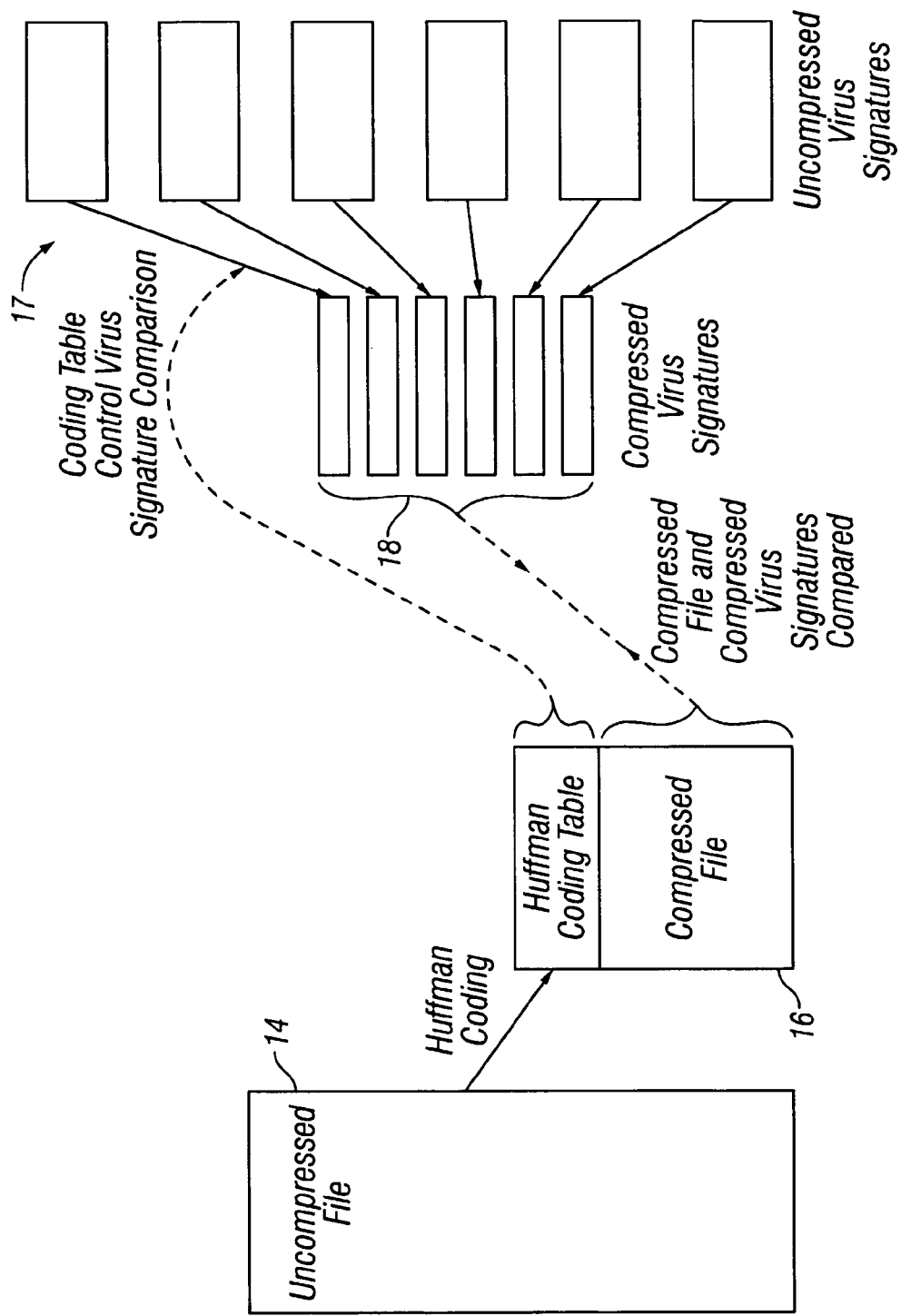
FIG. 2 schematically illustrates the relationship between an uncompressed computer file, a compressed computer file, uncompressed virus signatures and compressed virus signatures.

FIG. 2 illustrates an uncompressed computer file 14. Such a computer file 14 may be compressed, such as for example by Huffman coding, to form a compressed computer file 16 that includes a compressed body and a Huffman coding table as a header. The Huffman coding table is needed to decompress the compressed computer file 16 as it indicates which Huffman codes correspond to which byte sequences within the uncompressed computer file 14.

The anti-virus scanning system 8 incorporates the virus definitions 12 in the form of uncompressed virus signatures (malware signatures) 17. These virus signatures 17 might typically correspond to a sequence of twenty or so byte values that are indicative of a particular piece of malware. These uncompressed virus signatures 17 may be compressed using the coding table from the compressed computer file 16 to yield compressed virus signatures 18. The compressed virus signatures 18 and the compressed computer file 16 may then be compared, such as for example by using a Boyer Moore algorithm or a modified search algorithm as described in co-pending U.S. patent application No. (application No. not yet known) filed on 15 May 2001 entitled "Searching for Sequences of Character Data" and assigned to the same Assignee as the present application. The disclosure of this co-pending application is incorporated herein by reference. Another alternative search algorithm is based upon structuring the signatures in a tree as described in co-pending U.S. patent application No. (application No. not yet known) filed on 26 Jul. 2001 entitled "Tree Pattern System and Method for Multiple Virus Signature Recognition" and assigned to the same Assignee as the present application. The disclosure of this co-pending application is incorporated herein by reference.

Figure 3:
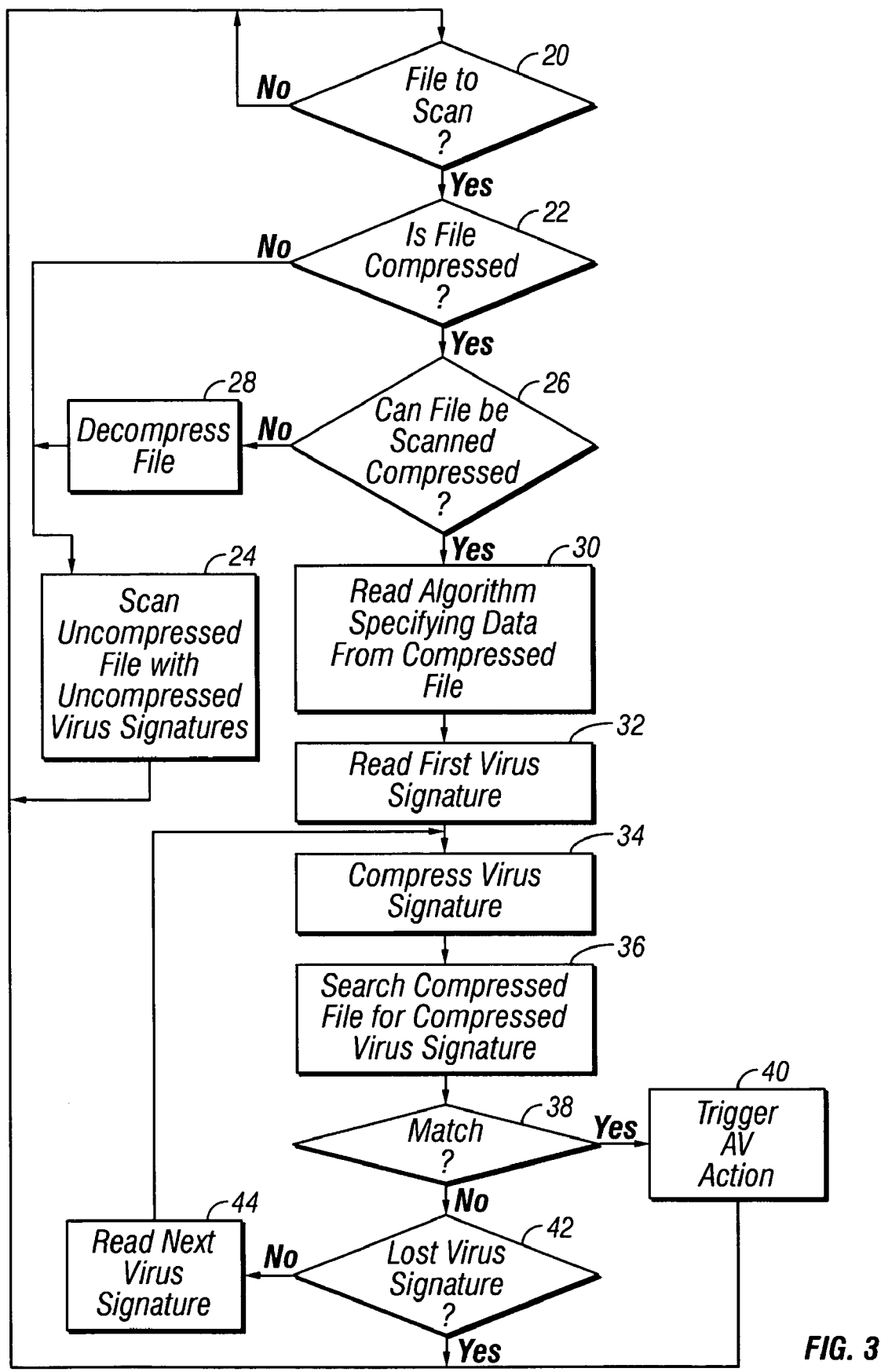
FIG. 3 is a flow diagram schematically illustrating the scanning for malware of computer files in accordance with one example embodiment of the present invention.

FIG. 3 is a flow diagram illustrating the processing performed in scanning a compressed computer file. At step 20 the system waits until a file to scan is received. Step 22 identifies whether or not the computer file to be scanned is a compressed computer file. If the computer file to be scanned is not a compressed computer file, then processing proceeds to step 24 at which conventional scanning techniques are applied for such uncompressed computer files. The conventional scanning techniques will not be described further herein as they are well known to those skilled in the art.

If step 22 identifies that the computer file to be scanned is a compressed computer file, then step 26 seeks to identify whether the compression algorithm that has been applied to that computer file is one that enables it to be scanned in its compressed form (e.g. Huffman coding). If the compression algorithm that has been used is not one that allows scanning in the compressed form, then processing proceeds to step 28 at which the compressed computer file is decompressed prior to processing at step 24 as for an uncompressed file.

If the test at step 26 indicates that the computer file was compressed with an algorithm that allows scanning whilst compressed, then step 30 serves to read any necessary data from the compressed computer file specifying the manner in which it has been compressed such that the virus signatures may be appropriately compressed in the same way before they are compared to the compressed file to identify any matches. As an example, if the compressed computer file was compressed using Huffman coding, then the Huffman coding table is read from the compressed computer file for use in compressing the virus signatures prior to comparison.

Step 32 reads the first virus signature from the list of virus definitions. Step 34 compresses this virus signature using the information obtained at step 30. Step 36 compares this compressed virus signature to the compressed file. This comparison may, for example, use a Boyer Moore algorithm. Step 38 determines whether or not a match has occurred between the compressed virus signature and the compressed computer file. If a match has occurred, then the anti-virus actions are triggered at step 40. These anti-virus actions may include deletion, quarantine, repair, alert message generation etc.

If step 38 indicated that no match was found, then step 42 determines whether or not the last virus signature in the list of virus signatures has yet been reached. If the last virus signature has been compared, then processing returns to step 20 to await the next computer file to be scanned. If the last virus signature has not yet been reached, then processing proceeds to step 44 at which the next virus signature in the list of uncompressed virus signature is selected and processing returned to step 44.

It will be appreciated that in the embodiment of FIG. 3 the virus signatures are compressed one at a time and then compared with the compressed computer file. It would also be possible to compress all the uncompressed virus signatures as one task and then use this library of compressed virus signatures to search the compressed computer file. Such an approach would facilitate the ability to search for multiple virus signatures in parallel using the modified Boyer Moore search technique of the type described in the above referenced co-pending application.

Figure 4:
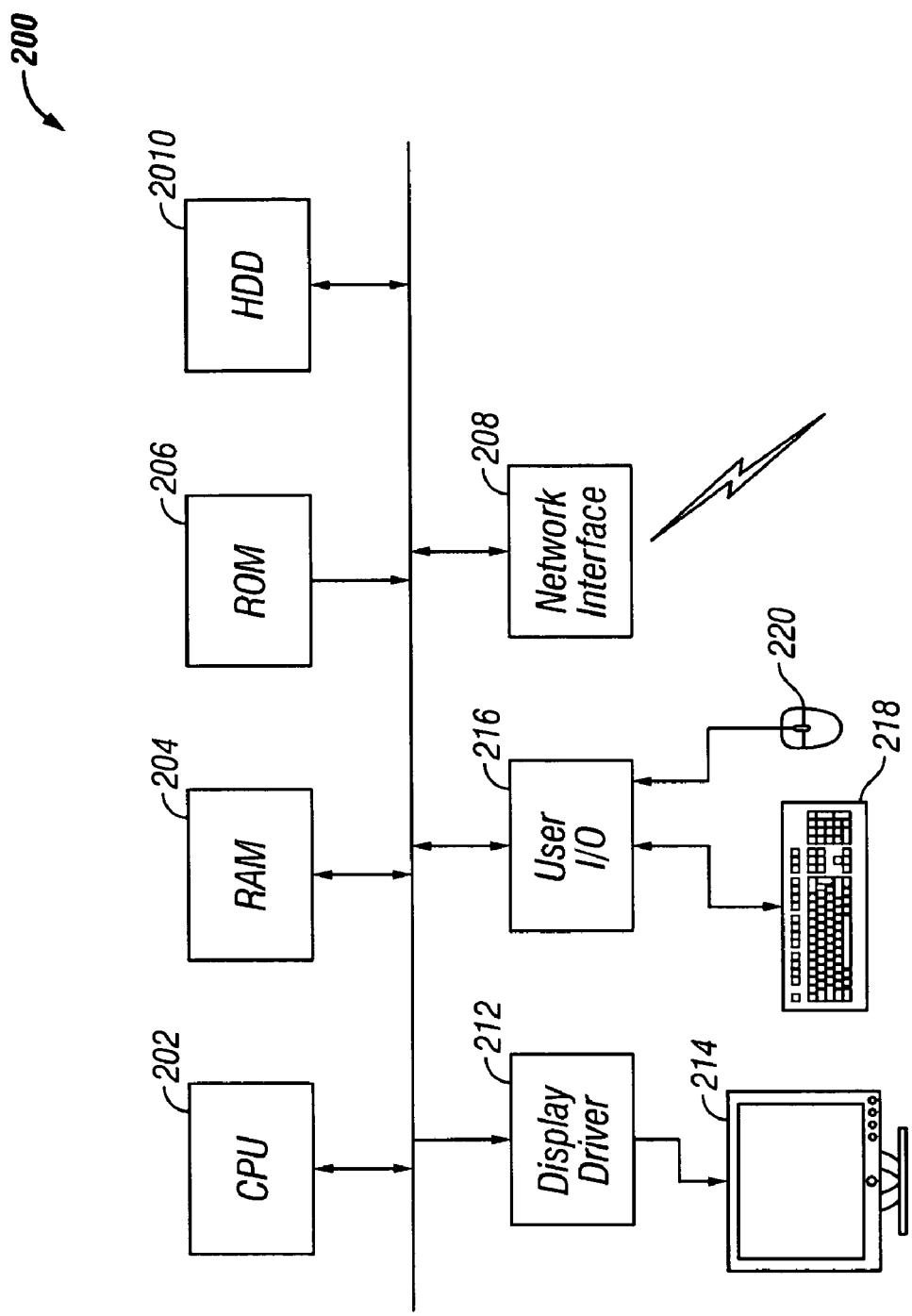
FIG. 4 schematically illustrates the architecture of a computer that may be used to implement the techniques discussed above.

FIG. 4 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 4 is only one example, e.g. a server may not have a screen and a mouse or keyboard.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium for controlling a computer to scan a compressed computer file for malware, said compressed computer file being compressed using a compression algorithm, said computer program product comprising:

comparison code operable to compare a plurality of compressed malware signatures compressed using said compression algorithm with said compressed computer file to identify malware within said compressed computer file.

2. A computer program product as claimed in claim 1, further comprising:

detection code operable to detect from a compressed computer file to be scanned what compression algorithm has been used to compress said compressed computer file; and compression code operable to compress a plurality of uncompressed malware signatures using said detected compression algorithm to generate said plurality of compressed malware signatures.

3. A computer program product as claimed in claim 2, wherein said detection code reads compression algorithm specifying data from said compressed computer file.

4. A computer program product as claimed in claim 3, wherein said compression algorithm uses Huffman coding and said compression algorithm specifying data includes a Huffman coding table used to compress said compressed computer file.

5. A computer program product as claimed in claim 1, wherein said comparison code uses a Boyer Moore algorithm or an algorithm based upon structuring the signatures in a tree.

6. A computer program product as claimed in claim 1, wherein said malware includes at least one of computer viruses, Trojans, worms, banned files and e-mails containing banned content.

7. A computer-implemented method for execution with computer code embodied on a tangible computer readable medium for scanning a compressed computer file for malware, said compressed computer file being compressed using a compression algorithm, said method comprising the step of:

comparing a plurality of compressed malware signatures compressed using said compression algorithm with said compressed computer file to identify malware within said compressed computer file.

8. A method as claimed in claim 7, further comprising the steps of:

detecting from a compressed computer file to be scanned what compression algorithm has been used to compress said compressed computer file; and compressing a plurality of uncompressed malware signatures using said detected compression algorithm to generate said plurality of compressed malware signatures.

9. A method as claimed in claim 8, wherein said step of detecting reads compression algorithm specifying data from said compressed computer file.

10. A method as claimed in claim 9, wherein said compression algorithm uses Huffman coding and said compression algorithm specifying data includes a Huffman coding table used to compress said compressed computer file.

11. A method as claimed in claim 7, wherein said step of comparing uses a Boyer Moore algorithm or an algorithm based upon structuring the signatures in a tree.

12. A method as claimed in claim 7, wherein said malware includes at least one of computer viruses, Trojans, worms, banned files and e-mails containing banned content.

13. Apparatus for scanning a compressed computer file for malware, said compressed computer file being compressed using a compression algorithm, said apparatus comprising:

comparison logic operable to compare a plurality of compressed malware signatures compressed using said compression algorithm with said compressed computer file to identify malware within said compressed computer file.

14. Apparatus as claimed in claim 13, further comprising:

detection logic operable to detect from a compressed computer file to be scanned what compression algorithm has been used to compress said compressed computer file; and compression logic operable to compress a plurality of uncompressed malware signatures using said detected compression algorithm to generate said plurality of compressed malware signatures.

15. Apparatus as claimed in claim 14, wherein said detection logic reads compression algorithm specifying data from said compressed computer file.

16. Apparatus as claimed in claim 15, wherein said compression algorithm uses Huffman coding and said compression algorithm specifying data includes a Huffman coding table used to compress said compressed computer file.

17. Apparatus as claimed in claim 13, wherein said comparison code uses a Boyer Moore algorithm or an algorithm based upon structuring the signatures in a tree.

18. Apparatus as claimed in claim 13, wherein said malware includes at least one of computer viruses, Trojans, worms, banned files and e-mails containing banned content.

* * * * *